United States Patent
Zheng et al.

(10) Patent No.: US 7,848,119 B2
(45) Date of Patent: Dec. 7, 2010

(54) DIRECT CURRENT TO DIRECT CURRENT CONVERTER

(75) Inventors: Jie-Jian Zheng, Shenzhen (CN); Tong Zhou, Shenzhen (CN); Jian-Hui Lu, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 400 days.

(21) Appl. No.: 12/069,921

(22) Filed: Feb. 12, 2008

(65) Prior Publication Data
US 2008/0192512 A1    Aug. 14, 2008

(30) Foreign Application Priority Data
Feb. 12, 2007    (TW) ............... 96104977 A

(51) Int. Cl.
*H02M 3/335* (2006.01)
(52) U.S. Cl. ................. 363/21.12; 363/21.16
(58) Field of Classification Search .... 363/21.12–21.18
See application file for complete search history.

(56) References Cited

U.S. PATENT DOCUMENTS

| | | | |
|---|---|---|---|
| 4,988,889 A * | 1/1991 | Oughton, Jr. ............. | 307/66 |
| 5,138,543 A | 8/1992 | Harm | |
| 5,675,479 A * | 10/1997 | Tani et al. ............... | 363/19 |
| 6,433,443 B2 * | 8/2002 | Nishida et al. .......... | 307/35 |
| 2006/0256588 A1 | 11/2006 | Chen | |

* cited by examiner

*Primary Examiner*—Bao Q Vu
*Assistant Examiner*—Jue Zhang
(74) *Attorney, Agent, or Firm*—Wei Te Chung

(57) ABSTRACT

An exemplary DC to DC converter (2) includes a transistor (29), a first rectifying and filtering circuit (21), a pulse generating circuit (27) and a transformer (25). The first rectifying and filtering circuit transforms an external AC voltage to a first DC voltage. The transformer includes a primary winding (251), an assistant winding (252) connected with the primary winding in a flyback mode, and a secondary winding (253). The first DC voltage is connected to ground via the primary winding, the transistor in series. The pulse generating circuit includes a controlling terminal, a diode, a resistor, and a capacitor. One terminal of the assistant winding is connected to ground, and the other terminal of the assistant winding is connected to an anode of the diode. A cathode of the diode is connected to ground via the resistor and the capacitor in series. The controlling terminal is connected to gate electrode of the transistor.

11 Claims, 2 Drawing Sheets

DIRECT CURRENT TO DIRECT CURRENT CONVERTER

FIELD OF THE INVENTION

The present invention relates to DC (direct current) to DC converters, and particularly to a DC to DC converter having a pulse generating circuit.

GENERAL BACKGROUND

DC to DC converters are frequently employed to convert relatively low voltage DC sources into high voltage DC sources. The high voltage DC sources are then suitable for application to a DC load, such as electrodes of an electron tube or other electrical devices.

Referring to FIG. 2, a typical DC to DC converter 1 includes a first rectifying and filtering circuit 11, a protecting circuit 13, a transformer 15, a second rectifying and filtering circuit 16, a pulse width modulation (PWM) circuit 17, a rectifying diode 18, and a transistor 19. The transistor 19 is a p-channel metal-oxide-semiconductor field-effect transistor (P-MOSFET).

The PWM circuit 17 includes a voltage input 171 configured to receive an operation voltage and a pulse output 172 configured to provide a pulse signal to a gate electrode of the transistor 19.

The first rectifying and filtering circuit 11 includes two inputs 111, 112 configured to receive an external alternating current (AC) voltage such as a 220V AC voltage, a full-bridge rectifying circuit 110 configured to convert the 220V AC voltage to a first direct current (DC) voltage, a filter capacitor 114 configured to stabilize the first DC voltage, and a first output 113 configured to provide the first DC voltage to the transformer 15. Two inputs of the full-bridge rectifying circuit 110 serve as the two inputs 111, 112. A positive output of the full-bridge rectifying circuit 110 serves as the first output 113. A negative output of the full-bridge rectifying circuit 110 is connected to ground. The filter capacitor 114 is connected between the first output 113 and ground.

The transformer 15 includes a primary winding 151, an assistant winding 152, and a secondary winding 153. The first output 113 of the first rectifying and filtering circuit 11 is connected to ground via the primary winding 151, a drain electrode and a source electrode of the transistor 19, and a resistor 190 in series. The gate electrode of the transistor 19 is connected to the pulse output 172 of the PWM circuit 17. The protecting circuit 13 is connected in parallel with the primary winding 151.

One terminal of the assistant winding 152 is connected to ground. The other terminal of the assistant winding 152 is connected to the voltage input 171 of the PWM circuit 17 via the anode and the cathode of the rectifying diode 18 in serials.

The secondary winding 153 is coupled to a second output 163 via the second rectifying and filtering circuit 16 for providing a second DC voltage to a load circuit (not shown) through the second output 163.

The external AC voltage is provided to the two inputs 111, 112 of the first rectifying and filtering circuit 11 and is transformed into the first DC voltage by the first rectifying and filtering circuit 11. Then the first DC voltage is provided to the primary winding 151. The assistant winding 152 induces the primary winding 151, generates an operation voltage, and provides the operation voltage to the voltage input 171 of the PWM circuit 17 via the rectifying diode 18. Thus the PWM circuit 17 generates the pulse signal for switching on or switching off the transistor 19. When the transistor 19 is switched on, a first current path is formed sequentially through the first output 113, the primary winding 151 of the transformer 150, the transistor 19, and the resistor 190. A first current is formed when the first DC voltage provided to the first output 113 is connected to ground via the first current path. The first current flowing through the first current path linearly increases until electromagnetic induction generated in the primary winding 151 reaches a predetermined maximum threshold.

When the transistor 19 is switched off, the energy stored in the primary winding 151 of the transformer 150 transfers to the secondary winding 153. Thus the second DC voltage is generated and provided to the load circuit. A rush current flowing through the primary winding 151 can be depressed by the protecting circuit 13.

However, because the PWM circuit 17 is an expensive component, the cost of the DC to DC converter 100 is correspondingly high.

It is desired to provide a new DC to DC converter which can overcome the above-described deficiencies.

SUMMARY

In one preferred embodiment, a DC to DC converter includes a first commutating and filter circuit, a pulse generating circuit and a transformer. The first commutating and filter circuit is configured for transforming an external AC voltage to a first DC voltage. The transformer includes a primary winding, an assistant winding connected with the primary winding in a flyback mode, and a secondary winding. The first DC voltage is connected to ground via the primary winding, a drain electrode and a source electrode of the transistor in series. The pulse generating circuit includes a controlling terminal, a diode, a resistor, and a capacitor. One terminal of the assistant winding is grounded, and the other terminal of the assistant winding is connected to an anode of the diode. A cathode of the diode is connected to ground via the resistor and the capacitor in series. A node between the resistor and the capacitor is defined as the controlling terminal and is connected to a gate electrode of the transistor.

Other novel features and advantages of the DC to DC converter will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
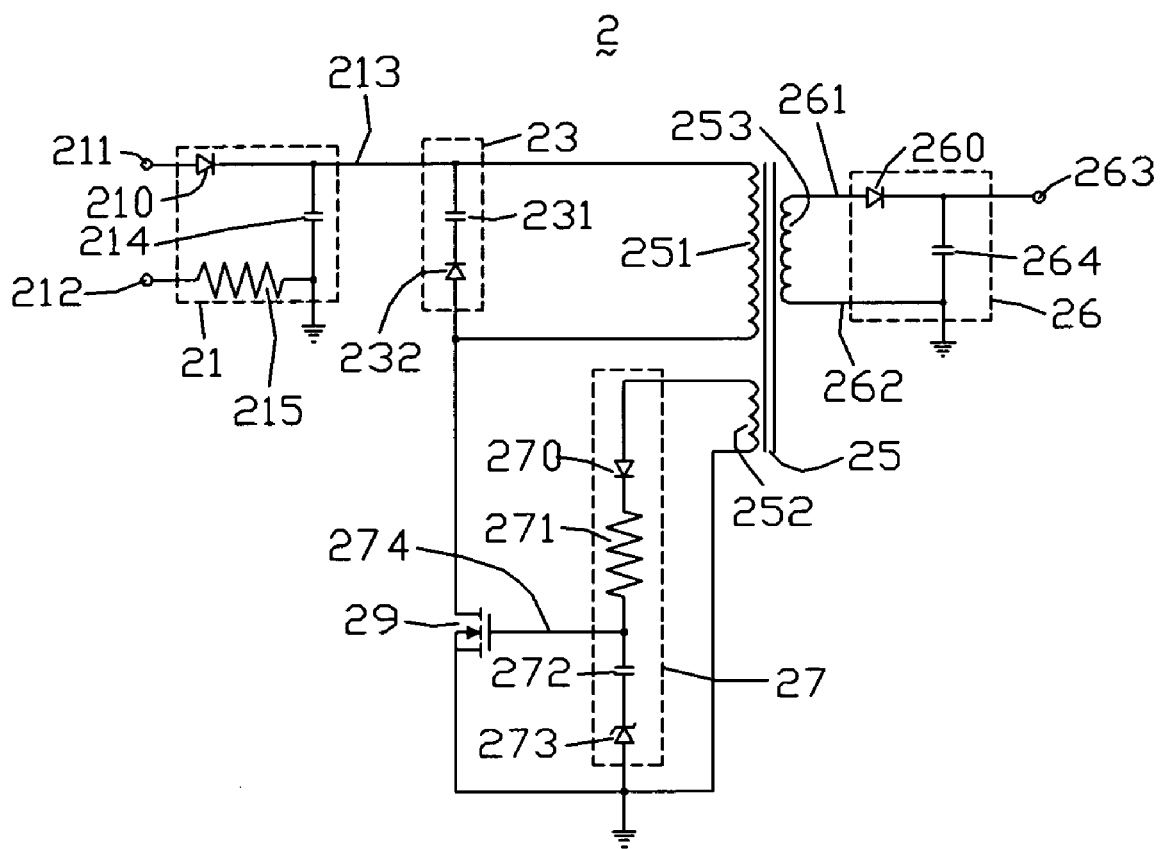
FIG. 1 is a circuit diagram of a DC to DC converter according to an exemplary embodiment of the present invention.
Figure 2:
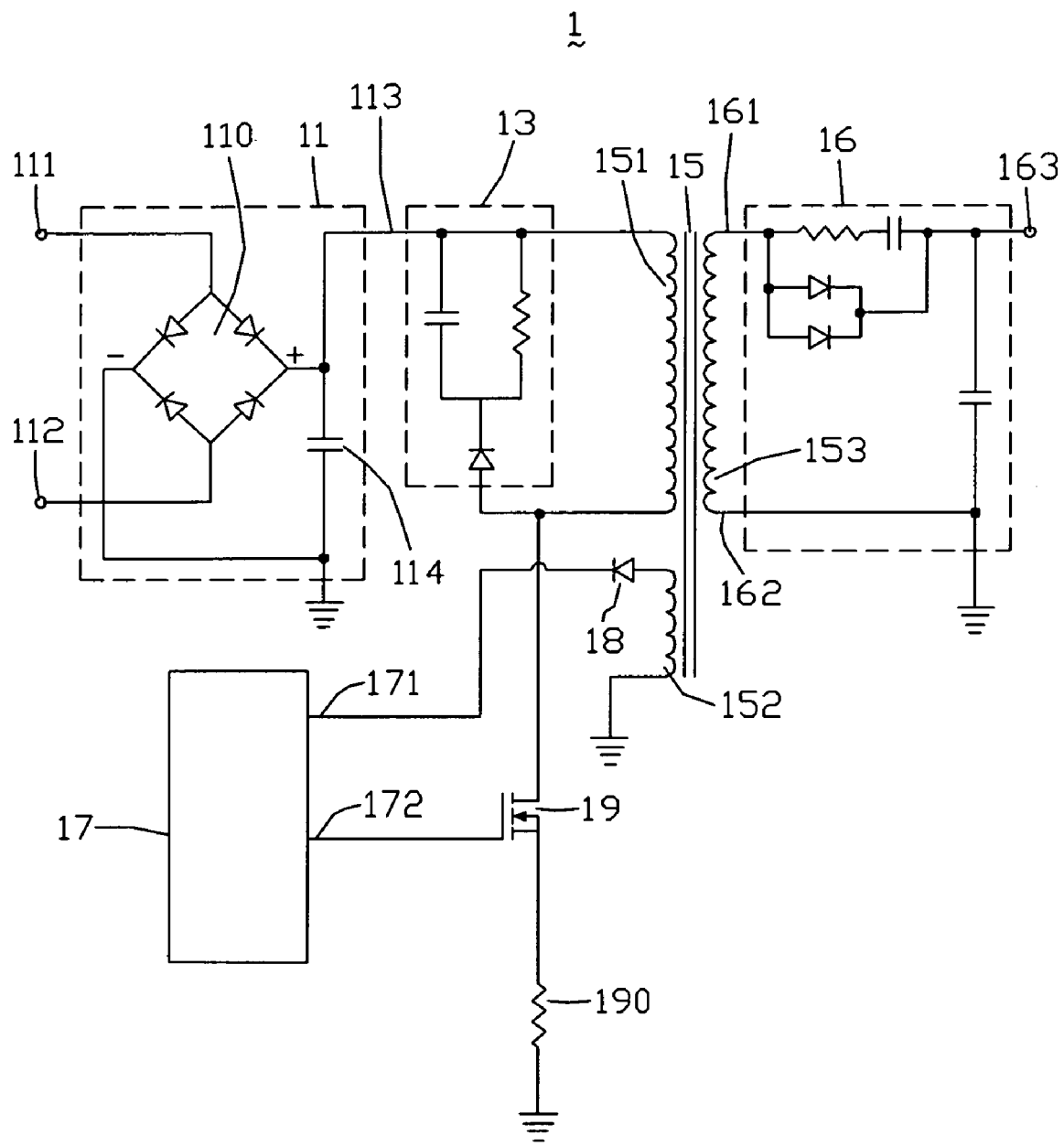
FIG. 2 is a circuit diagram of a conventional DC to DC converter.

Referring to FIG. 1, this is a circuit diagram of a DC to DC converter 2 according to an exemplary embodiment of the present invention. The DC to DC converter 2 includes a first rectifying and filtering circuit 21, a protecting circuit 23, a transformer 25, a second rectifying and filtering circuit 26, a pulse generating circuit 27, and a transistor 29. The transistor 29 is a p-channel metal-oxide-semiconductor field-effect transistor (P-MOSFET).

The first rectifying and filtering circuit 21 includes two inputs 211, 212 configured to receive an external alternating current (AC) voltage such as a 220V AC voltage, a rectifying diode 210 configured to convert the 220V AC voltage to a first DC voltage, a filter capacitor 214 configured to stabilize the first DC voltage, a current limiting resistor 215, and a first output 213 configured to provide the first DC voltage to the transformer 25. The anode of the first rectifying diode 210 is connected to one input 211. The cathode of the first rectifying diode 210 is connected to the first output 213. The filter capacitor 214 is connected between the first output 213 and ground. The current limiting resistor 215 is connected between the other input 212 and ground.

The transformer 25 includes a primary winding 251, an assistant winding 252 connected with the primary winding 251 in a flyback mode, and a secondary winding 253. The first output 213 of the first rectifying and filtering circuit 21 is connected to ground via the primary winding 251, and a drain electrode and a source electrode of the transistor 29 in series.

The protecting circuit 23 includes a protecting capacitor 231 and a protecting diode 232 connected in series. The anode of the protecting diode 232 is connected to the drain electrode of the transistor 29. The cathode of the protecting diode 232 is connected to the first output 213 via the protecting capacitor 231. Thus the protecting circuit 23 is connected in parallel with the primary winding 251.

The pulse generating circuit 27 includes a control terminal 274 and a branch circuit. The branch circuit includes a diode 270, a resistor 271, a capacitor 272, and a zener diode 273 connected in series. One terminal of the assistant winding 252 is connected to ground, and the other terminal of the assistant winding 252 is connected to the anode of the diode 270. The cathode of the diode 270 is connected to the cathode of the zener diode 273 via the resistor 271 and the capacitor 272 in series. The anode of the zener diode 273 is connected to ground. A node between the resistor 271 and the capacitor 272 is defined as the control terminal 274, and is connected to a gate electrode of the transistor 29.

The second rectifying and filtering circuit 26 includes a second rectifying diode 260, a second filter capacitor 264, and a second output 263 for providing a second DC voltage to a load circuit (not shown). One terminal of the secondary winding 253 is connected to ground, and the other terminal of the secondary winding 253 is connected to the second output 263 via the second rectifying diode 260. The filter capacitor 264 is connected between the second output 263 and ground.

The external AC voltage is provided to the two inputs 211, 212 of the first rectifying and filtering circuit 21 and is transformed into the first DC voltage by the first rectifying and filtering circuit 21. When the first DC voltage is provided to the primary winding 251, the primary winding 251 is charged and electromagnetic energy is stored therein. Thus a first current flows through the primary winding 251. The assistant winding 252 induce the primary winding 251, and generates a third DC voltage. Because the assistant winding 252 is connected to the primary winding 251 in a flyback mode, the diode 270 is cut off. Thus no current flows through the assistant winding 252 and the third DC voltage is increased at the beginning. When the third DC voltage is increased greater than a predetermined voltage, the diode 270 is conducted and the electromagnetic energy stored in the assistant winding 252 is discharged to charge the capacitor 272 via the resistor 271. Thus a fourth voltage crossing the capacitor 272 is increased and the third DC voltage crossing the assistant winding 252 is decreased.

When a voltage at the control terminal 274 which is connected to the node between the resistor 271 and the capacitor 272 is increased greater than a threshold value, the transistor 29 is switched on.

After the capacitor 272 is charged to be in a saturation state and the fourth voltage crossing the capacitor 272 reaches a predetermined maximum value, the diode 270 is cut off again and the capacitor 272 and the primary winding 251 start to charge the assistant winding 252. Thus the fourth voltage crossing the capacitor 272 is decreased as energy of the capacitor 272 transfers to the assistant winding 252. Therefore the third DC voltage crossing the assistant winding 252 is increased.

When the voltage at the controlling terminal 274 is decreased less than the threshold value, the transistor 29 is switched off.

When a charging current flowing through the assistant winding 252 is approximately equal to zero, the third DC voltage crossing the assistant winding 252 reaches a maximum value. Then the electromagnetic energy stored in the assistant winding 252 is discharged to charge the capacitor 272 via the resistor 271 again.

When the DC to DC converter 2 repeats the above operation, a pulse signal is generated at the control terminal 274 of the pulse generating circuit 27. The pulse signal is configured to switch on or switch off the transistor 29. The pulse signal is a negative pulse signal. The zener diode 273 is configured to restrict a negative voltage of the pulse signal in a predetermined range.

When the transistor 29 is switched on, a current path is formed sequentially through the first output 213, the primary winding 251 of the transformer 250, and the transistor 29. A second current is formed when the first DC power supply provided to the first output 213 is connected to ground via the current path. When the transistor 29 is switched off, the energy stored in the primary winding 251 of the transformer 250 transfers to the secondary winding 253. Thus the second DC voltage is generated and provided to the load circuit.

Because the DC to DC converter 2 uses the assistant winding 252 and the diode 270, the resistor 271 and the capacitor 272 of the pulse generating circuit 27 to generate the negative pulse signal, a PWM circuit is not needed. Therefore, the configuration of the DC to DC converter 2 is simplified, and the cost of the DC to DC converter 2 is reduced.

It is to be understood, however, that even though numerous characteristics and advantages of the preferred embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A direct current (DC) to DC converter comprising:
   a transistor comprising a gate electrode, a drain electrode, and a source electrode;
   a first rectifying and filtering circuit configured for transforming an external alternating current (AC) voltage to a first DC voltage;
   a transformer comprising a primary winding, an assistant winding connected with the primary winding in a flyback mode, and a secondary winding, the first DC voltage being connected to ground via the primary winding, the drain electrode and the source electrode of the transistor in series;
   a pulse generating circuit comprising a controlling terminal, a diode, a resistor, and a capacitor, one terminal of the assistant winding being connected to ground, the other terminal of the assistant winding being connected to the anode of the diode, the cathode of the diode being connected to ground via the resistor and the capacitor in series, a node between the resistor and the capacitor being defined as the control terminal and being connected to the gate electrode of the transistor; and a zener diode connected between the capacitor and ground, the anode of the zener diode being connected to ground.

2. The DC to DC converter as claimed in claim 1, wherein a negative pulse signal is generated at the control terminal.

3. The DC to DC converter as claimed in claim 1, wherein the zener diode is configured for restricting a negative voltage of the pulse signal in a predetermined range.

4. The DC to DC converter as claimed in claim 1, further comprising a protecting circuit connected in parallel with the primary winding.

5. The DC to DC converter as claimed in claim 4, wherein the protecting circuit comprises a protecting capacitor and a protecting diode connected in series, the anode of the protecting diode being connected to the drain electrode of the transistor, the cathode of the protecting diode being connected to the first output via the protecting capacitor.

6. The DC to DC converter as claimed in claim 1, wherein the first rectifying and filtering circuit comprises two inputs configured for receiving the external alternating current (AC) voltage, a first rectifying diode configured for converting the external AC voltage to the first DC voltage, a filter capacitor configured for stabilizing the first DC voltage, a current limiting resistor, and a first output configured for providing the first DC voltage to the transformer.

7. The DC to DC converter as claimed in claim 6, wherein the anode of the first rectifying diode is connected to one of the two inputs, the cathode of the first rectifying diode being connected to the first output, the filter capacitor being connected between the first output and ground, the current limiting resistor being connected between the other input and ground.

8. The DC to DC converter as claimed in claim 7, wherein the external AC voltage is a 220V AC voltage.

9. The DC to DC converter as claimed in claim 1, further comprising a second rectifying and filtering circuit connected to the secondary winding of the transformer.

10. The DC to DC converter as claimed in claim 1, wherein the second rectifying and filtering circuit comprises a second rectifying diode, a second filter capacitor, and a second output for outputting a second DC voltage, one terminal of the secondary winding being connected to ground, the other terminal of the secondary winding being connected to the second output via the second rectifying diode, the filter capacitor being connected between the second output and ground.

11. The DC to DC converter as claimed in claim 1, wherein the transistor is a p-channel metal-oxide-semiconductor field-effect transistors (P-MOSFETs).

* * * * *